United States Patent [19]
Allain et al.

[11] 4,044,301
[45] Aug. 23, 1977

[54] MODULAR IONIZATION CHAMBER OF THE BORON-COATING TYPE

[75] Inventors: Jacques Allain, Palaiseau; Jean Duchene, Fontenay-aux-Roses; Marc Merelli, Plaisir, all of France

[73] Assignee: Commissariat a l'Energie Atomique, Paris, France

[21] Appl. No.: 570,131

[22] Filed: Apr. 21, 1975

[30] Foreign Application Priority Data

Apr. 19, 1974 France .................. 74.13768

[51] Int. Cl.² ............ G01N 27/00; H01J 39/22
[52] U.S. Cl. ................... 324/33; 313/61 R; 250/390
[58] Field of Search ............ 324/33; 313/61 R, 61 D; 250/390, 391, 374, 379; 176/19 R

[56] References Cited
U.S. PATENT DOCUMENTS

| | | | |
|---|---|---|---|
| 2,976,443 | 3/1961 | Johnson | 313/61 |
| 3,355,587 | 11/1967 | Jenckel | 250/41.9 |
| 3,359,443 | 12/1967 | Givens | 313/61 |
| 3,702,409 | 11/1972 | Goodings et al. | 313/61 D |
| 3,707,632 | 12/1972 | Cooper et al. | 250/83.3 PD |
| 3,809,940 | 5/1974 | Sekella | 313/61 R |

FOREIGN PATENT DOCUMENTS 821,188 9/1959 United Kingdom .............. 250/856

Primary Examiner—Rudolph V. Rolinec
Assistant Examiner—Vincent J. Sunderdick
Attorney, Agent, or Firm—Sughrue, Rothwell, Mion, Zinn and Macpeak

[57] ABSTRACT

A leak-tight cylindrical metal casing filled with an ionizable gas contains a plurality of modules each having the function of an independent ionization chamber. Electrically insulated resilient means serve to maintain each module in position both radially and longitudinally within the casing. A central cylindrical core within each module serves as a support for two concentric cylindrical electrodes whose opposite faces are coated with boron-10.

4 Claims, 9 Drawing Figures

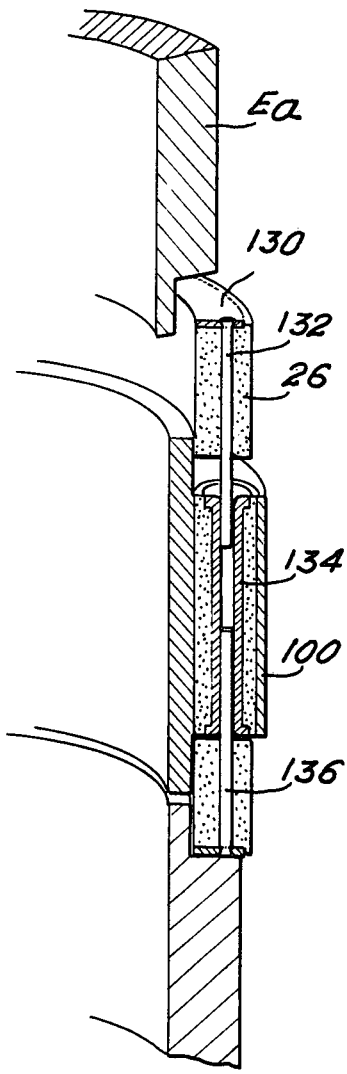
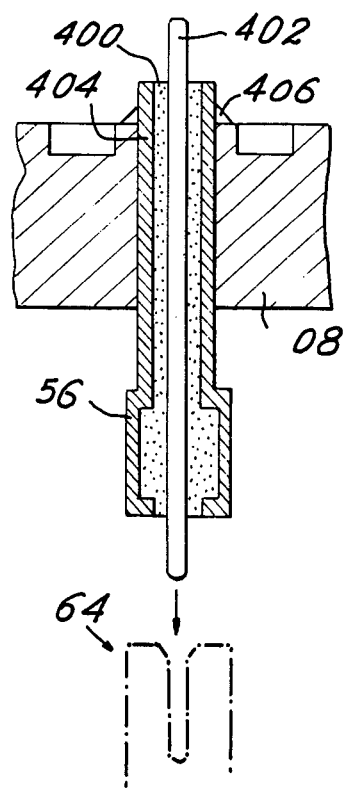

MODULAR IONIZATION CHAMBER OF THE BORON-COATING TYPE

BACKGROUND OF THE INVENTION

This invention relates to a boron-coating ionization chamber for detecting and measuring the level of neutron flux existing within a nuclear reactor.

Chmabers of this type are also known and the general principle on which tehy are based is described for example in French Pat. No. 2,133,798. Boron chambers filled with an ionizable gas are usually constructed with two electrodes which are brought to different potentials and at least one of which is coated with boron. The neutrons generated in the nuclear reactor use the (n,α) reaction to produce lithium nuclei and α-particles which cause ionization of the filling-gas atoms. The ions thus created are transported towards the two electrodes and collected on these latter. The measurement of the corresponding charges or in other words the measurement of the current which circulates between the two electrodes provides a measurement of the neutron flux to which the ionization chamber is subjected.

Ionization chambers (having a coating of boron or of fissile material) are subjected to high values of neutron flux and to considerable vibrations in nuclear reactors of the pressurized-water type and boiling-water type; under such critical and exacting conditions of operation, ionization chambers of known types have exhibited a degree of reliability which is too low to ensure a sufficiently long service life and have also proved excessively sensitive to vibrations.

In order to carry out measurements which are adapted to the intended use of the reactor, it also proves necessary to divide the ionization chamber into a plurality of electrically independent modules, the connection of such modules being left to the choice of the operator for a predetermined application.

Special care has to be given to the mechanical structure of the chamber in order to compensate for any expansion and to prevent any fatigue of materials which would result in damage, defective leak-tightness and faulty insulation of the electrical bushings.

SUMMARY OF THE INVENTION

The present invention has for its object a boron-coating ionization chamber of substantial length and of modular design, that is to say comprising a number of different modules placed electrically in a configuration which is adapted to the desired mode of utilization, wherein said ionization chamber retains a high degree of reliability both in regard to leak-tightness and in regard to electrical insulation when subjected to mechanica vibrations of substantial amplitude such as those imposed by pressurized-water reactors or boiling-water reactors and when subjected to high neutron-flux levels.

In more exact terms, the boron-coating ionization chamber in accordance with the invention comprises:

A leak-tight cylindrical metallic casing filled with an ionizable gas and containing N modules, each module being intended to operate in an independent ionization chamber and being constituted by a metallic cylindrical central core serving as a support by means of cylindrical insulating rings in concentric relation to said central core for concentric cylindrical electrodes Ea and Eb whose opposite faces are provided with a coating of boron-10;

A high-voltage supply cable for connecting a voltage source to the electrode Ea;

K insulated cables for transporting electric charges collected on L electrodes Eb in series which form part of N modules, a connection being provided by each cable between an outlet of the chamber and an electrode Eb through a leak-tight insulating cable-bushing Pa located in the vicinity of the welded junction between the core of the cable and the electrode Eb;

K + 1 measurng and high-voltage supply cables for connecting the ionization chamber to electrical measuring instruments and to a voltage source through leak-tight insulating cable-bushings Pb.

In accordance with the invention, the design function of the leak-tight metallic casing which provides a separation between the ionization chamber and the external atmosphere has been dissociated from the boron-coated electrode Ea. This offers the advantage of better electrical insulation in addition to the fact that leak-tightness is more readily ensured. If so desired, it is accordingly possible in addition to connect different parts of the electrodes Ea to different potentials delivered by a voltage source. In accordance with the invention, there has thus been formed an ionization chamber comprising N modules, the independence of which is related to the connection of the electrodes Ea and Eb between two adjacent modules. The modular concept of the chamber permits weighting of the signals delivered by different portions of the chamber or in other words different associated modules so as to deliver the signal which is proportional to the reactor power, that is to say to the value of the neutron flux. This weighting makes it possible to suppress the influence of the control-rod positions. The chamber operates in the current-measuring mode; the neutrons absorbed by the boron-10 which covers the oppositely-facing nternal surfaces of the electrodes Ea and Eb cause the formation of lithium nuclei and α-particles which ionize the gas between the two electrodes, e.g. nitrogen. These ionized particles are collected as a result of the potential difference between the two electrodes Ea and Eb and directed towards a highly sensitive current-measuring instrument, thus giving a current which is proportional to the neutron flux.

In accordance with the invention, in order to endow each module with good mechanical strength within the interior of the ionization chamber, each module is placed and maintained in position by three transverse springs working in compression and disposed at angular intervals of 120°, said springs being attached to the central core of said module and applied by means of a ball against the internal surface of the casing; longitudinal fixing is achieved by means of six springs disposed at angular intervals of 60°, said springs being placed between the core of the adjacent module and the insulating rings.

The longitudinal springs compensate for expansions of the electrodes of one core with respect to the other and work in compression. Said longitudinal springs are applied against the insulating rings in order to prevent impairment of the electrical insulation. The three transverse springs ensure that each core is maintained in the central position with respect to the casing.

As has already been mentioned, the low currents collected on each electrode must necessarily be directed towards a measuring chamber through cables having very high insulation resistance. These insulating cables must be capable of withstanding the instense mechanical vibrations of the reactor vessel; in order to ensure good insulation, special care must be devoted to the design and construction of the insulating cable-bushings.

In accordance with the invention, the ionization chamber comprises insulating cable-bushings Pa of a novel type; each insulating bushing Pa comprises:

a solid cylindrical aluminum core;

a tube of nickel-iron alloy crimped onto a portion of the aluminum core;

a cylindrical ring of aumina surrounding a portion of the nickel-iron tube and brazed onto said nickel-iron tube;

a lead ring inserted between the alumina ring and a coaxial aluminum sheath;

an insulator of alumina powder compacted between the aluminum core, the coaxial aluminum sheath and the alumina ring so that said aluminum sheath, the alumina powder insulation and the aluminum core constituted one of the K cables having high insulation resistance.

Similarly, in order to transmit signals delivered by the ionization chamber through the top of the reactor core to the measuring chamber, use is made of K + 1 cables, the two extremities of which are provided with insulating cable-bushings of type Pb. These cables in which the core and the stainless steel sheath are insulated by means of compacted alumina powder terminate in leak-tight bushings each comprising:

a cylindrical sheath of nickel-iron alloy surrounding the stripped extremity of the cable and welded to the extremity of said core;

a coaxial cylindrical ring of alumina which is brazed around the lower portion of said sheath;

a cylindrical skirt of nickel-iron alloy which is brazed around the alumina ring and welded around the cable sheath.

These two types of cable-bushings retain a high degree of leak-tightness at high neutron-flux levels even when they are subjected to intense mechanical vibrations. In spite of its highly hygroscopic nature, the alumina owder consequently maintains excellent insulation between the core and the sheath of cables which transmit electric signals.

In one embodiment of the invention, the central core, the casing of the ionization chamber and the electrodes Ea and Eb are of aluminum and the cylindrical insulating rings are of alumina.

It is readily apparent that the boron coating on the electrodes Ea and Eb can be replaced by a coating of fissile material such as uranium, for example.

BRIEF DESCRIPTION OF THE DRAWINGS

Further properties and advantages of the invention will be brought out more clearly by the following description of exemplified embodiments which are given by way of explanation without any limitation being implied, reference being made to the accompanying drawings, in which:

FIG. 6 is a sectional view of the electrical contact between two electrodes which form part of two adjacent modules;

FIG. 9 is a diagram of a leak-tight junction bushing at the outlet of the useful portion of the ionization chamber.

DESCRIPTION OF THE PREFERRED EMBODIMENT

Figure 1:
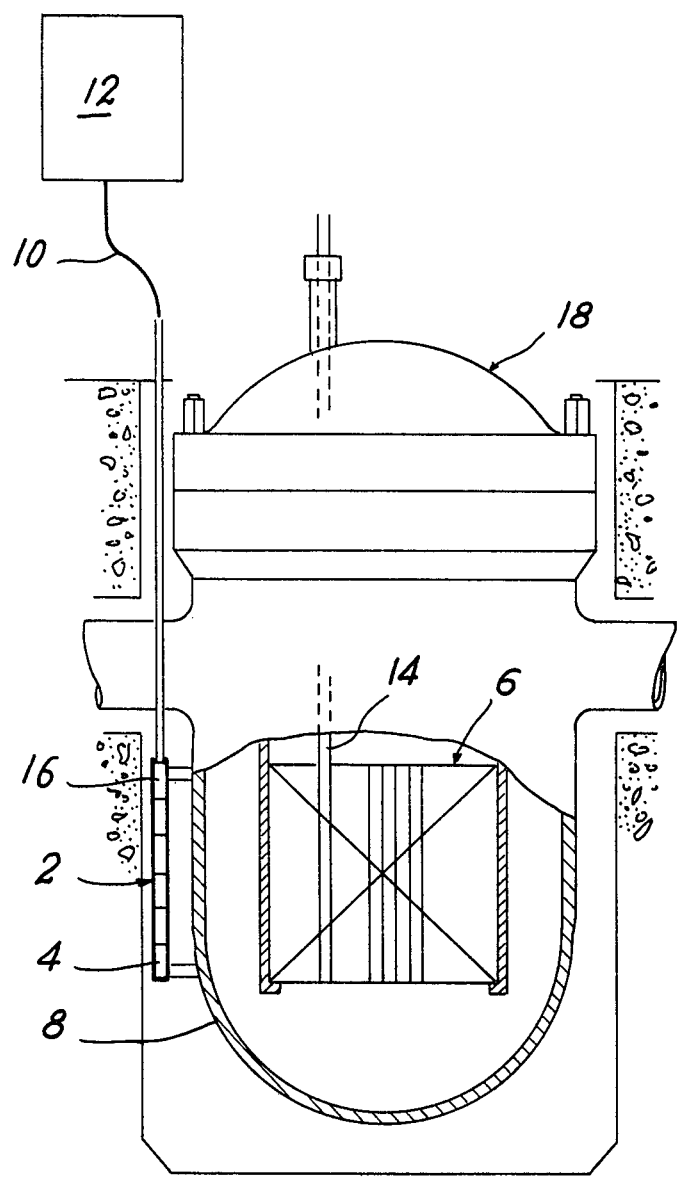
FIG. 1 is a view of a nuclear reactor equipped with the boron-coating ionization chamber.

As shown in FIG. 1, the boron-coating ionization chamber 2 is attached to the walls of a nuclear reactor containment vessel and comprises different modules such as the module 4 which is placed outside the vessel containing the reactor core 6, said core being in turn placed within said containment vessel 8. The leads for supplying voltage and measuring current at the electrodes are connected by a bus-line 10 to a measuring chamber 12 comprising current-measuring instruments and a high-voltage supply. The position of the chamber comprising N modules is such that, when the reactor control rods are half-inserted to a point such as 14, measurement of the different signals emitted by the different modules such as 4 makes it possible to determine the influence of the control rods as a function of height on the reactor power and, by weighting the signals emitted by the different modules (or groups of modules), to know the total power of the reactor. It is apparent that the neutron flux is of lower value in the control-rod region of the reactor (since said control rod absorbs neutrons). The modular device accordingly makes it possible to determine the mean power of the reactor by weighting the signals emitted by the module 4 and the module 16, for example. Provision is made for a closure assembly 18 at the top end of the reactor vessel 8.

Figure 2:
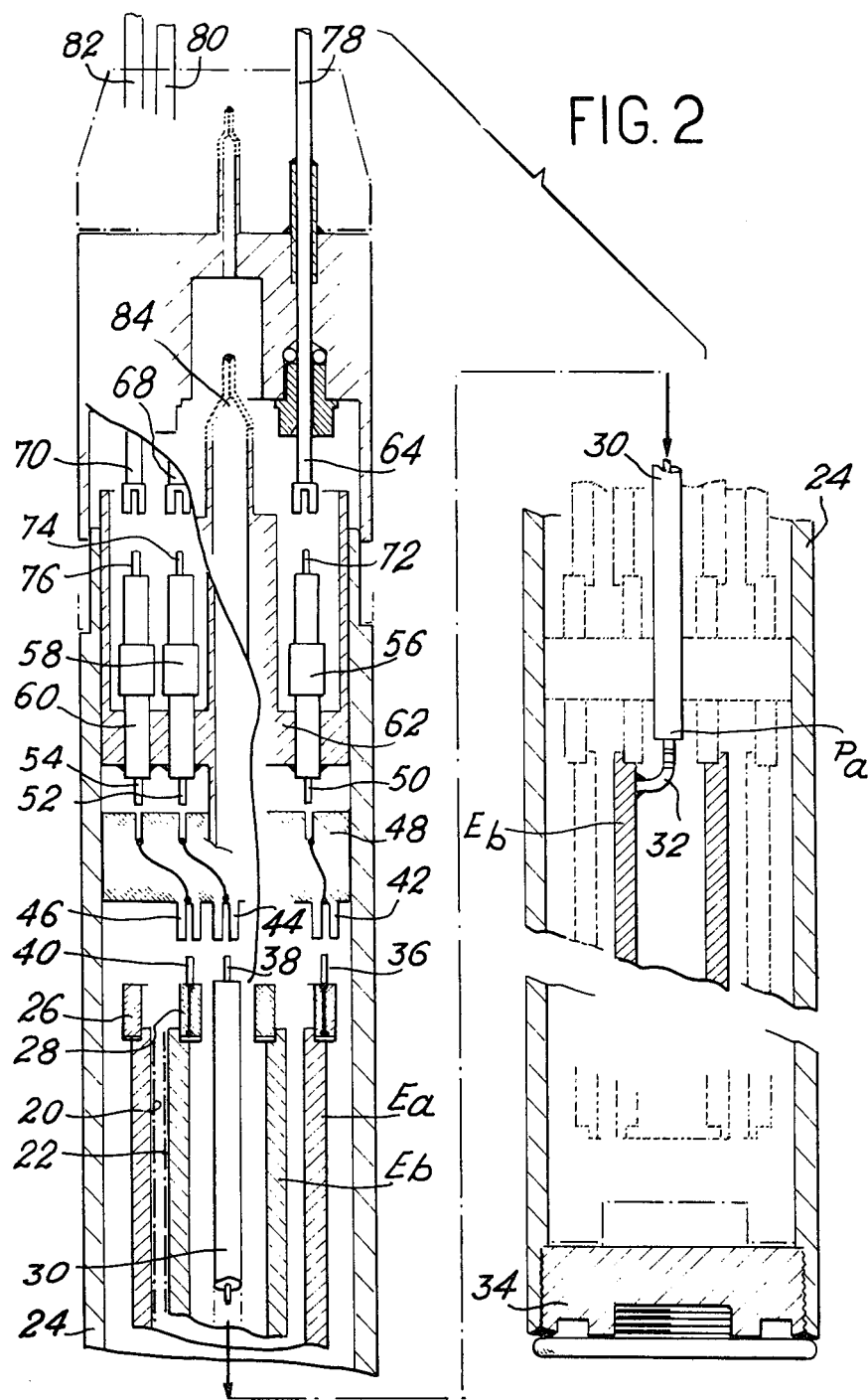
FIG. 2 is a sectional view of the boron-coating ionization chamber.

FIG. 2 shows an exploded view of the boron-coating ionization chamber. The opposite faces 20 and 22 of the electrodes Ea and Eb which are concentric with the axis of the chamber are provided with a coating of boron. Said electrodes are insulated from he casing 24 and from the central core (both of these elements being formed of aluminum in order to prevent excessive neutron absorption) by means of concentric rings of alumina such as the rings 26 and 28. In this example of construction, the boron-coating chamber is divided into two sets of three elements, the electrodes of type Eb of the fourth, fifth and sixth elements being connected to the measuring chamber by means of the cable 30. A leak-tight connector 32 of type Pa which will be described hereinafter after serves to connect the cable 30 to the electrode Eb of the fourth module. The end of the chamber is closed-off by means of an aluminum plug 34. The connections between the different electrodes and the outlet of the ionization chamber are placed at the other end of the cable 30. The studs such as those designated by the references 36, 38 and 40 which provide connections respectively between the electrode Ea and two portions of the electrode Eb are inserted in the socket connectors 42, 44 and 46. A support 48 of alumina maintains said socket connectors in position. Plug connectors 50, 52 and 54 are inserted in said socket connectors and maintained by means of bushing insulators 56, 58 and 60 which will be described hereinafter. An annular component 62 of aluminum endows the assembly with mechanical strength and rigidity. The cables such as 64, 68 and 70 for current output and high-voltage input are engaged over the plug connectors 72, 74 and 76. Provision is made at the outlet of the ionization chamber for three cables, one cable 78 being intended to supply high voltage to the electrodes Ea and the cables 80 and 82 being current-measurement cables. A vacuum is created within the ionization chamber by means of the nipple 84, said nipple being then employed for filling with an ionizable gas such as nitrogen.

Figure 3:
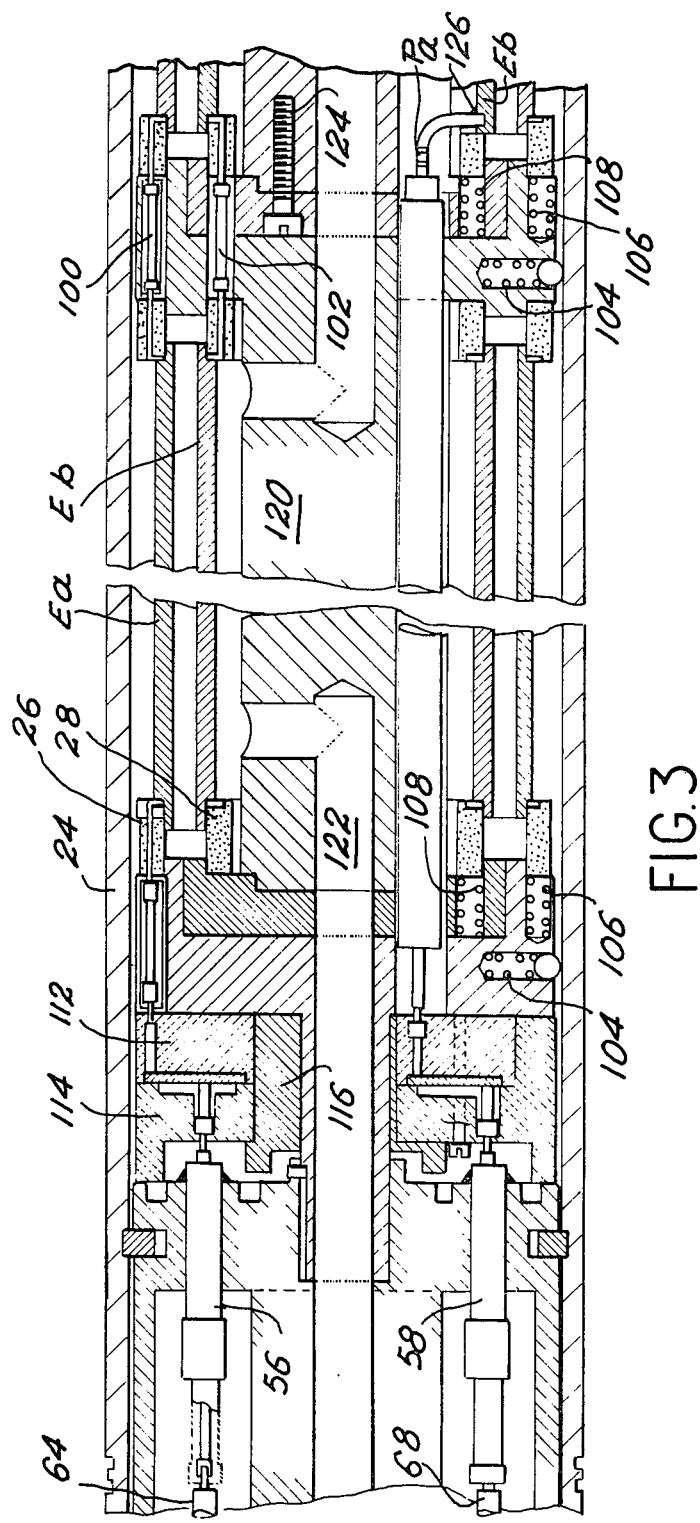
FIG. 3 is a sectional view of one module of the boron-coating ionization chamber.

FIG. 3 is a sectional view showing one module of the ionization chamber in accordance with the invention. The connections between two electrodes Ea forming part of two modules are shown at 100; similarly, the connections between two electrodes Eb are shown at 102 when they exist (they do not exist between the third and the fourth modules). The transverse springs such as the spring 104 which are disposed at angular intervals of 120° maintain each module in a central position within the casing. Similarly, the springs such as those designated by the references 106 and 108 which are applied against the rings of alumina such as those designated by the references 26 and 28 maintain each module in a longitudinal position within the casing. The springs such as 106 work in compression. The alumina blocks such as those designated by the references 112, 114 and 116 isolate the cable-bushing for the currents passed to the voltage and current supply cable. The passages such as 122 in the central core 120 permit the flow of ionizable gas from one module to the other. The screws such as 124 serve to secure the aluminum cores from one module to the other. The insulating cable-bushing Pa is located in the vicinity of the connection of the current-supply cable which is welded to the electrode Eb at 126. In this example of construction, the chamber is composed of two sets of three modules and the cable-bushing Pa is located within the fourth module. It is readily apparent that any other mode of connection such as six independent modules, three sets of two modules and so forth comes within the scope of the invention.

Figure 4:
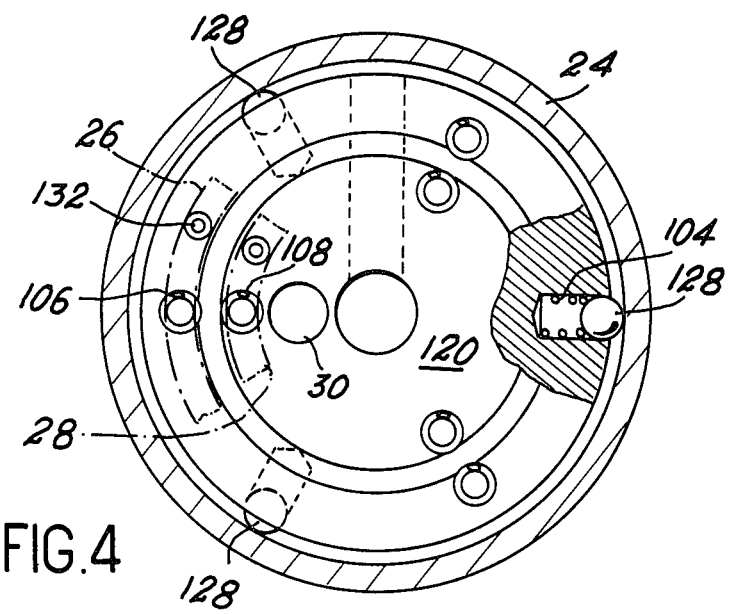
FIG. 4 is a top view of the device comprising three springs for positioning a module within the casing.

FIG. 4 is a top sectional view showing three springs 104 which serve to maintain the central core 120 within the casing 24. The balls 128 on which the springs 104 are applied are formed of alumina in order to insulate the central core from the casing. The springs 104 work in compression. Both the central core 120 and the casing 24 are of aluminum.

Figure 5:
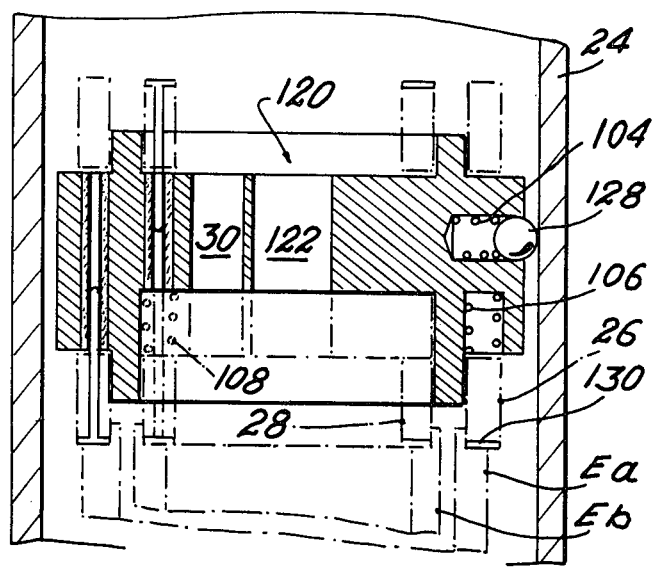
FIG. 5 is a sectional view of the spring-type positioning device of the ionization chamber.

FIG. 5 shows the system of position-setting of the electrodes Ea and Eb together with the transverse-positioning springs 104 and the longitudinal-positioning springs 106. Said springs are placed between a core as designated by the reference 120 and the insulating rings of alumina as designated by the reference 26. In order to ensure a good contact between the alumina ring 26 and the aluminum electrode Ea, a thin deposit of a nickel-iron alloy and a deposit of gold is applied at 130.

FIG. 6 shows the junction between two electrodes such as Ea or Eb which form part of two modules. As shown in FIG. 5, the high-voltage electrode Ea bears on the annular shoulder 130 on which is fixed a ring of nickel-iron alloy covered with a thin deposit of gold in order to ensure a good contact. In FIG. 6, the alumina ring 26 is traversed by a conducting rod 132 which provides the male contact; the tube 134 performs the function of female contact and ensures an electrical short-circuit between the rod 132 and the rod 136. The male and female contacts form the junction 100 shown in FIG. 3.

Figure 7:
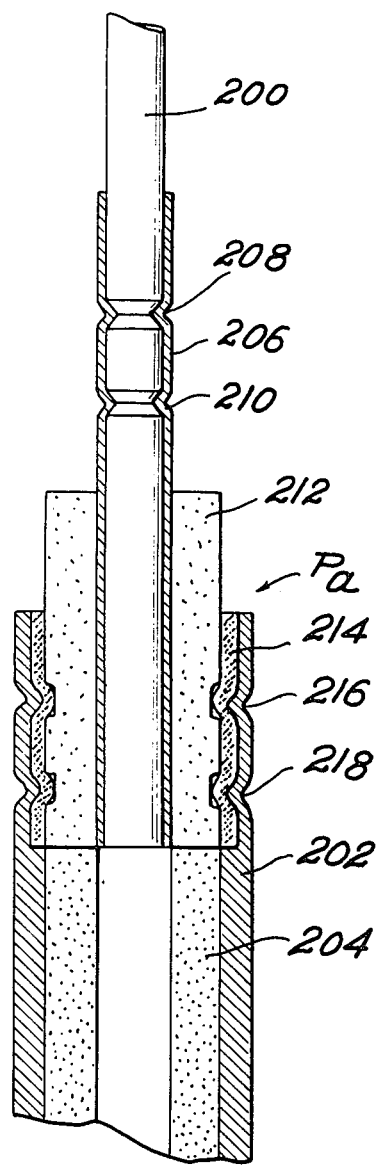
FIG. 7 is a sectional view of a leak-tight cable-bushing of type Pa.

FIG. 7 illustrates the leak-tight cable-bushing of type Pa in which a tube 200 having an aluminum core and an aluminum sheath 202 is filled with an alumina powder 204. It is in order to prevent the hygroscopic alumina 204 from becoming saturated with water and thus destroying the insulation between the sheath 202 and the core 200 that the leak-tight cable-bushing of type Pa is fabricated with extremely great care. Said bushing comprises a nickel-iron tube 206 which is press-fitted on the aluminum core 200 by deformation into the two circular grooves 208 and 210. The alumina component 212 is brazed on the tube 206 in leak-tight manner by a conventional method. A lead skirt 214 is interposed between the aluminum sheath 202 and the alumina ring 212. Two circular grooves 216 and 218 serve to set the aluminum core in the lead skirt and the alumina ring 212. The cable-bushing of type Pa ensures that the cable retains high insulating properties throughout the lifetime of the ionization chamber. The bushing Pa is fabricated as follows. The alumina powder is removed from the end portion of the cable over a length of a few millimeters and the internal surface of the aluminum sheath 202 is very carefully machined with a lathe or by means of a milling-cutter while the length of the core 200 is maintained so as to exceed that of the sheath 202 by a few centimeters. A bushing element formed of alumina 212 and nickel-iron 206 is inserted by sliding within the cavity thus formed. Said bushing is constituted by a hollow cylinder 212 of alumina in which a nickel-iron tube is brazed in leak-tight manner. The cylindrical component of alumina is provided in its external surface with two burnished circular grooves. The bare cable is first heated in vacuo in an oven until a high insulation resistance is obtained. Finally, the oven is opened while at the same time establishing a strong flow of argon in order to ensure that the ends of the cable are not in contact with air. There is then placed at the end of the oven a nozzle having a central aperture through which extremity of the cable is permitted to pass whilst apertures placed at the periphery of the nozzle permit diffusion of argon. The insulating cable-bushing is then placed in position at the end of the cable, still in an argon atmosphere, the bushing element being passed over the core of the cable and fitted in position. A lead cylinder 214 is then placed between the external surface of the alumina and the internal surface of the cable sheath. The following operation consists in crimping the cable sheath and the lead skirt on the alumina component at the level of the two circular grooves 216 and 218 by means of a suitable roller-die. Crimping on the aluminum core is also performed at two points 208 and 210 of the nickel-iron tube.

Figure 8:
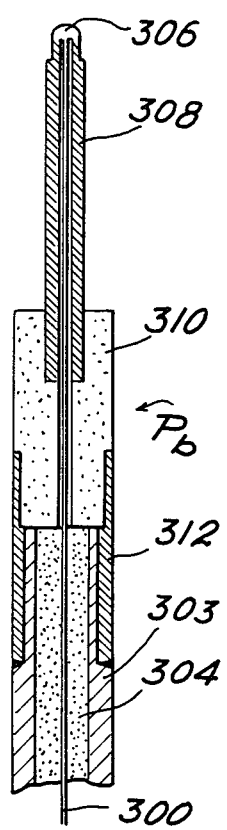
FIG. 8 is a diagram of a leak-tight cable-bushing of type Pb.

There are shown in FIG. 8 the cable-bushings of type Pb which are employed in the case of the three cables used for connecting the ionization chamber to the measuring chamber 12. These cables must be capable of withstanding high neutron-flux levels and a high-level γ-radiation environment. Said cables are each constituted by a stainless steel core 300, the sheth 303 being also of stainless steel. The insulation 304 is a powder of either alumina or magnesia. Since these insulating materials are highly hygroscopic, the leak-tight insulating cable-bushings such as Pb are provided at each end in order to maintan an insulation resistance of the cable which is higher than $10^{13}$ ohms. The stainless steel core 300 is welded at 306 to a tube 308 of nickel-iron alloy.

Said tube 308 is brazed onto the alumina ring 310 with a brazing compound having a high melting point. A skirt 312 of nickel-iron alloy surrounds the sheath 303 of the cable and the alumina ring 310 and is welded to these two components. In this example, the sheath 303 of the cable is machined in such a manner as to ensure that the skirt 312 covers the cable as shown whereas the core passes through the tube. Said bushing Pb is formed as follows: the bare cable is first heated in vacuo in vacuo in an oven of the same type as the oven employed for the fabrication of the bushings Pa. The insulating cable-bushing Pb is placed in position at the end of the cable in an argon atmosphere and argon-arc welding is carried out so as to join the skirt 312 to the cable sheath 303 and so as to join the tube 308 to the core 306. The same operations are performed on the opposite ends of each cable.

FIG. 9 shows the leak-tight bushings employed for leading-out the high-voltage and current conductors from the useful portion of the ionization chamber. Said bushings are shown on the tube 56 of FIG. 3. Tubes of this type are filled with insulating material 400 and each constituted by a core 402 and a sheath 404 of nickel-iron alloy. Said tubes are welded at 406 to the aluminum block 408 by means of the argon-arc welding process without addition of flux.

What we claim is:

1. A boron-coating ionization chamber comprising a leak-tight cylindrical casing containing N modules each operating as an independent ionization chamber, each module being constituted by a central cylindrical core serving as a support by means of cylindrical insulating rings in concentric relation to said central core for two concentric cylindrical electrodes Ea and Eb whose opposite faces are provided with a coating of boron, electrically insulated resilient means for maintaining each module radially with respect to said casing including three transverse springs working in compression and disposed at angular intervals of 120°, said springs attached to the central core of said module and applied by means of an insulating ball against the internal surface of the casing, and electrically insulated resilient means for maintaining the modules longitudinally with respect to each other including six longitudinal springs disposed at angular intervals of 60°, said springs be placed between the core of the adjacent module and the insulating rings.

2. An ionization chamber according claim 1, wherein the central core, the casing of the ionization chamber and the electrodes Ea and Eb are of aluminum and the cylindrical insulating rings are of alumina.

3. A boron-coating ionization chamber comprising a leak-tight cylindrical casing containing N modules each operating as an independent ionization chamber, each module being constituted by a central cylindrical core serving as a support by means of cylindrical insulating rings in concentric relation to said central core for two concentric cylindrical electrodes Ea and Eb whose opposite faces are provided with a coating of boron, electrically insulated resilient means for maintaining each module radially with respect to said casing, electrically insulated resilient means for maintaining the modules longitudinally with respect to each other, a high-voltage supply cable for connecting a voltage source to the electrode Ea, K insulated cables for transporting electric charges collected on L electrodes Eb in series, a connection being provided by each cable between an outlet of the chamber and an electrode Eb through a leak-tight insulating cable bushing Pa located in the vicinity of the welded junction between the core of the cable and the electrode Eb, and K + 1 measuring and high-voltage supply cables for connecting the ionization chamber of electrical measuring instruments and to a voltage source through leak-tight insulating cable-bushing Pb, wherein said insulating cable-bushing Pa comprises:

a solid cylindrical aluminum core;
a tube of nickel-iron alloy crimped on a portion of the aluminum core;
a cylindrical ring of alumina surrounding a portion of the nickel-iron tube and brazed onto said nickel-iron tube;
a lead ring inserted between the alumina ring and a coaxial aluminum sheath;
an insulator of alumina powder compacted between the aluminum core, the coaxial aluminum sheath and the alumina ring so that said aluminum sheath, the alumina powder insulation and the aluminum core constituted one of the K cables having high insulation resistance.

4. A boron-coating ionization chamber comprising a leak-tight cylindrical casing containing N modules each operating as an independent ionization chamber, each module being constituted by a central cylindrical core serving as a support by means of cylindrical insulating rings in concentric relation to said central core for two concentric cylindrical electrodes Ea and Eb whose opposite faces are provided with a coating of boron, electrically insulated resilient means for maintaining each module radially with respect to said casing, electrically insulated resilient means for maintaining the modules longitudinally with respect to each other, a high-voltage supply cable for connecting a voltage source to the electrode Ea, K insulated cables for transporting electric charges collected on L electrodes Eb in series, a connection being provided by each cable between an outlet of the chamber and an electrode Eb through a leak-tight insulating cable bushing Pa located in the vicinity of the welded junction between the core of the cable and the electrode Eb, and K + 1 measuring and high-voltage supply cables for connecting the ionization chamber to electrical measuring instruments and to a voltage source through leak-tight insulating cable-bushings Pb, wherein each of the K + 1 cables comprises a cable core and a stainless steel sheath insulated by means of compacted alumina powder, and each of said Pb cable-bushings comprises:

a cylindrical sheath of nickel-iron alloy surrounding the stripped extremity of the cable core and welded to the extremity of said core;
a coaxial cylindrical ring of alumina which is brazed around the lower portion of said sheath;
a cylindrical skirt of nickel-iron alloy which is brazed around the alumina ring and welded around the cable sheath.

* * * * *